Sept. 15, 1970    F. L. SWILLINGER    3,528,795
MOLTEN METAL CONTAINING EDGE LOCATORS FOR FLOAT GLASS RIBBONS
Filed July 12, 1967    2 Sheets-Sheet 1

INVENTOR.
Francis L. Swillinger
BY
Collins & Oberlin
ATTORNEYS

Sept. 15, 1970  F. L. SWILLINGER  3,528,795
MOLTEN METAL CONTAINING EDGE LOCATORS FOR FLOAT GLASS RIBBONS
Filed July 12, 1967  2 Sheets-Sheet 2

INVENTOR.
Francis L. Swillinger
BY Collins & Oberlin
ATTORNEYS

United States Patent Office 3,528,795
Patented Sept. 15, 1970

3,528,795
MOLTEN METAL CONTAINING EDGE LOCATORS FOR FLOAT GLASS RIBBONS
Francis L. Swillinger, Perrysburg, Ohio, assignor to Libbey-Owens-Ford Glass Company, Toledo, Ohio, a corporation of Ohio
Filed July 12, 1967, Ser. No. 652,919
Int. Cl. C03b *18/02*
U.S. Cl. 65—182                               6 Claims

ABSTRACT OF THE DISCLOSURE

A locating, guiding retaining device, for the edge of a glass ribbon moving over a bath of molten metal in a float glass forming apparatus is in the form of a carbon boat that floats in the molten bath and is anchored by a water cooled pipe extending into the boat and partially immersed in a body of bath metal carried thereby. The flow of cooling water through the pipe establishes heat transfer between the pipe, the body of both metal in the boat, and the boat in order to create convection currents in the bath of molten metal for urging the glass ribbon toward the boat.

BACKGROUND OF THE INVENTION

Field of the invention

This invention relates broadly to the manufacture of sheets or plates of glass by the float process and more particularly to the manner in which a ribbon of glass, floating on the bath of molten metal is located on the bath and guided in its movement from the forming to the discharge end of the float apparatus.

DESCRIPTION OF THE PRIOR ART

A representative type of float glass forming apparatus is illustrated and described in U.S. Pat. No. 3,083,551, granted Apr. 2, 1963, and, as there explained, the manufacture of flat glass by the float process involves delivering glass at a controlled rate onto a bath of molten metal and advancing it along the surface of the bath under physical and thermal conditions which assure (1) that a layer of molten glass will be established on the bath, (2) that the glass in the layer can flow laterally unhindered to develop on the surface of the bath a buoyant body of molten glass of stable thickness, and (3) that the buoyant body in ribbon form will be continuously advanced along the bath and sufficiently cooled as it advances to permit it to be taken unharmed out of the bath by mechanical conveying means.

Above the float bath of molten metal a tightly enclosed head space or plenum chamber is provided to contain the so-called float atmosphere, which is usually a non-oxidizing gas or mixture of gases such as nitrogen and hydrogen under sufficient pressure to prevent contamination by leakage into the head space.

Such an apparatus will produce an ultimate ribbon of a thickness essentially the same as the stable or equilibrium thickness of the buoyant body, but a thinner ultimate ribbon may be produced by increasing the speed of the mechanical conveying means that removes the ribbon from the molten bath, thereby increasing the tractional effort on and so attenuating the glass body of stable thickness as it is advanced along the bath.

In any event, successful operation of the float process requires that the ribbon be located transversely of the bath and guided and retained in this location as it is advanced through the float apparatus and until it is removed from the molten bath at the discharge end.

As explained in U.S. Pat. No. 3,223,503, granted Dec. 14, 1965, it has heretofore been proposed to "steer" the glass ribbon as it moves over the molten bath by the use of so-called water fences consisting of cooled, stainless steel pipes extending into the molten bath at either side of and spaced from the desired path of the ribbon. These fences set up oppositely moving convection currents, in and at the surface of the bath that act to simultaneously urge the ribbon toward the opposite walls of the bath tank (see column 5, lines 43 to 69 of the patent). The fences also acted to define the limit of lateral movement of the ribbon and, although normally out of contact with the edges thereof, could be moved inwardly to mechanically push the ribbon toward one side or the other of the float bath (column 4, lines 52 to 69 of the patent).

However, such devices were capable only of "steering" the ribbon along a general path and were subject to such rapid deterioration as necessitated their having to be replaced every 3 to 10 days throughout a campaign. In addition they created objectionable conditions known as fence bubbles and tin fizz, which were apparently due to the hydrogen dissolved in the tin going out of solution in the area of the fences, and were responsible for distortion defects in the glass near the edge of the ribbon.

SUMMARY OF THE INVENTION

According to the present invention there is provided edge locating and retaining means that function on an essentially different principle to guide the ribbon over the float bath along a more precise predetermined path and which, at the same time, have a surprisingly long life and avoid setting up conditions in the float bath that would cause defects in the finished float glass product.

Briefly stated, the device of this invention comprises a contoured, boat-like member of a material that is inert to or that any rate will not adversely affect either the metal in the bath or the glass in the ribbon and which is designed to float on the molten metal of the float bath. The boat-like member is positioned in the float bath along the exact line that it is desired to have the edge of the ribbon follow and is anchored in this position and cooled to an extent sufficient to establish lateral convection currents in the molten metal of the float bath that will urge the ribbon toward and maintain it in contact with the floating boat-like guide member.

As indicated above, it is a primary object of this invention to provide a ribbon edge locating and retaining member of improved construction that will effectively and precisely guide and direct the movement of the float glass ribbon as it is advanced over the float bath and that will not adversely affect either the glass in the ribbon or the molten metal in the bath.

Another object is the provision of such a guide member that is contoured to permit and facilitate contact with and accurate guiding of the glass ribbon regardless of the configuration of the ribbon edge.

Still another object is to provide a water cooled guide member of this character that will exert sufficient cooling action on the adjacent molten metal in the float bath to set up transverse convection currents therein, that will maintain the glass ribbon in contact with the guide member, but that will not stick to the glass in the ribbon advancing therepast and in sliding contact therewith.

Other objects and advantages of the invention will become apparent during the course of the following description, when taken in connection with the accompanying drawings.

BRIEF DESCRIPTION OF THE DRAWINGS

In the drawings, wherein like numerals are employed to designate like parts throughout.

DESCRIPTION OF THE PREFERRED EMBODIMENT

Figure 1:
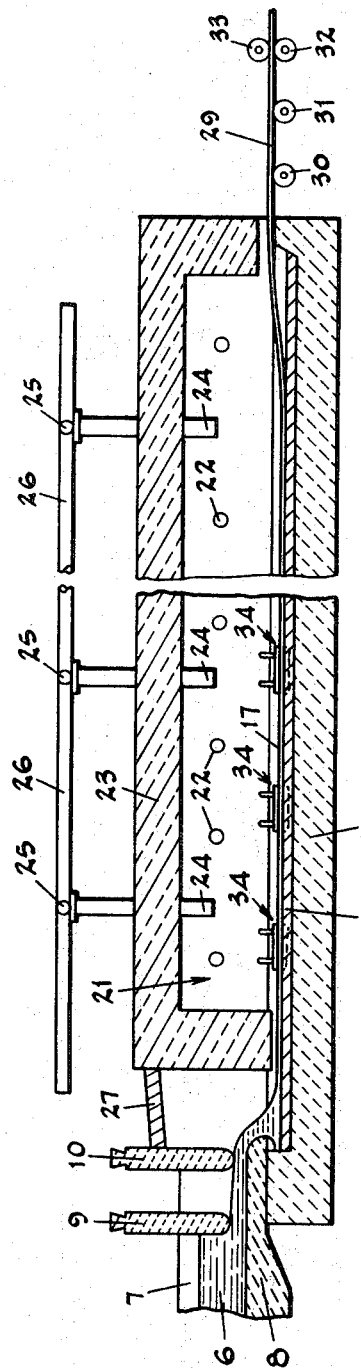
FIG. 1 is a longitudinal, vertical, sectional view through a conventional float glass forming machine equipped with the guide means of this invention.
Figure 2:
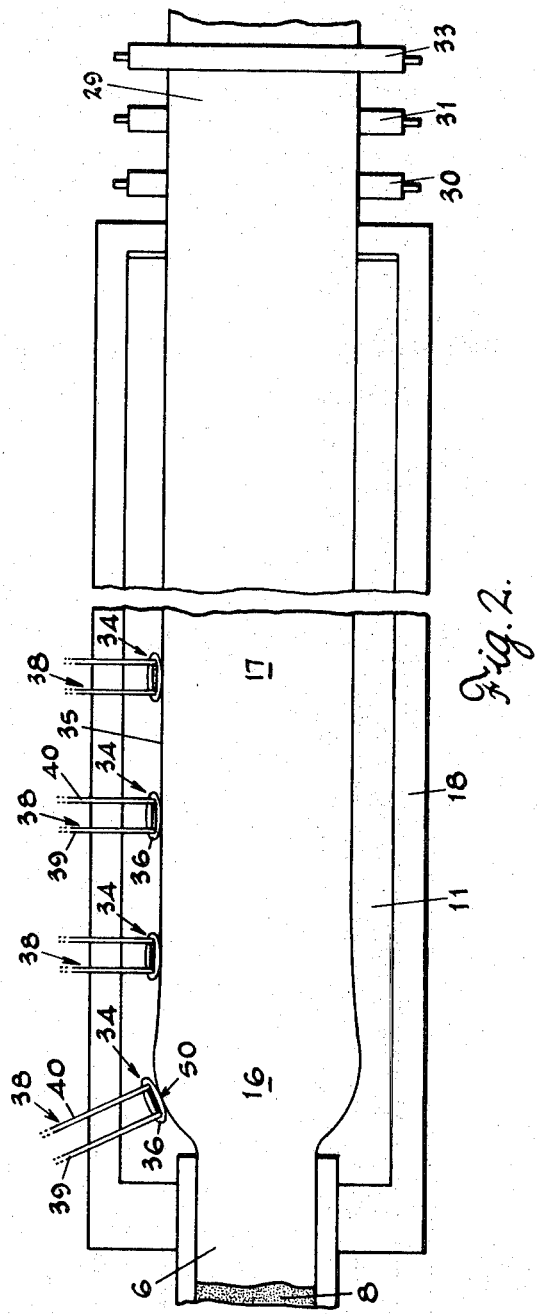
FIG. 2 is a plan view of the apparatus of FIG. 1 with the plenum chamber removed.

Referring now more particularly to the drawings there is illustrated in FIGS. 1 and 2 a typical float glass machine similar to one disclosed in U.S. Pat. 3,083,551. In this apparatus molten glass 6 is supplied from a forehearth 7 to a spout lip 8 in an amount regulated and controlled by a tweel 9 and a gate 10.

The glass flowing from the spout 8 onto the metal bath 11 forms a buoyant molten body indicated at 16 and a buoyant layer of stable thickness 17 develops therefrom as it is advanced over the molten bath.

The metal bath (usually of tin) in the tank structure 18 and the headspace 21 over the bath are heated by radiant heat directed downwardly from heaters 22 and the headspace 21, which contains the "float atmosphere," is enclosed by a roof structure or plenum chamber 23 which, with extension 27, makes it possible to maintain a sufficient volume of protecting gas over that part of the metal bath 11 that is exposed at each side of the glass in the float chamber. The roof structure 23 is provided at intervals with ducting 24 connected by branches 25 to headers 26 through which the protecting gas is fed into the headspace 21 at a rate to create a plenum therein. The protecting gas is one which will not chemically react with tin to produce contaminants of the glass (for example, a mixture of nitrogen and hydrogen) and, by providing a plenum ingress to the headspace 21, entrance of atmospheric air is prevented.

When the ultimate ribbon 29 is to be of substantially the same thickness as the equilibrium or stable thickness of the glass the temperature of the glass in the buoyant layer or ribbon 17 must be carefully controlled so as to progressively cool it from the tweel 9 to the discharge end of the apparatus by which time the ribbon surface should reach a temperature at which it is sufficiently stiffened to allow its transfer to a lehr on mechanical conveying means without detriment to the surface, e.g., about 650° C. at which the viscosity is about $10^7$ poises.

One type of mechanical conveying means that can be used includes supporting rollers 30 to 32 and superimposed roller 33 mounted outside of the discharge end of the tank. Any or all of the rollers 30 to 33 may be driven and cooperate to apply a tractive effort to the ribbon of glass moving towards the outlet end sufficient to advance it along the bath.

When a ribbon of less than equilibrium thickness is desired, this can be obtained by increasing the speed of the rollers 30 to 33 and thereby modifying their tractional effort and attenuating the molten glass body 17 of stable thickness.

In any event, however, it is important that the ribbon of glass, which includes the buoyant body 16 as well as the buoyant layer 17, be accurately guided along a predetermined path as it is advanced over the bath 11 and until it is removed in the final form shown at 29.

According to the present invention this is preferably accomplished by providing a series of boat-like retaining and guide members, designated in their entireties by the numeral 34, and floating them in a line along the length of the bath, as best shown in FIG. 2, that defines the path it is desired to have followed by an edge 35 of the ribbon.

Figure 3:
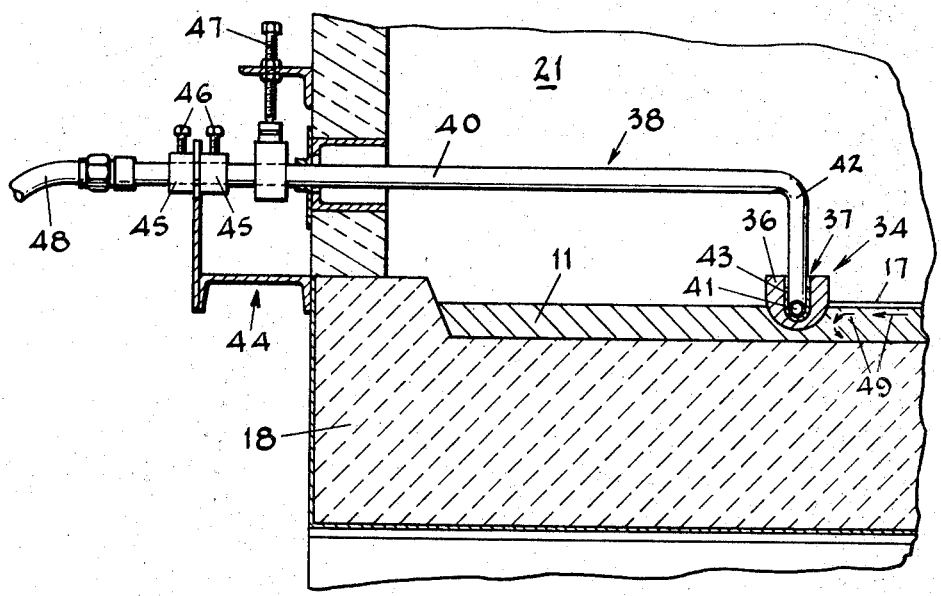
FIG. 3 is a fragmentary, transverse sectional view on an enlarged scale taken substantially along the line 3—3 in FIG. 2.
Figure 4:
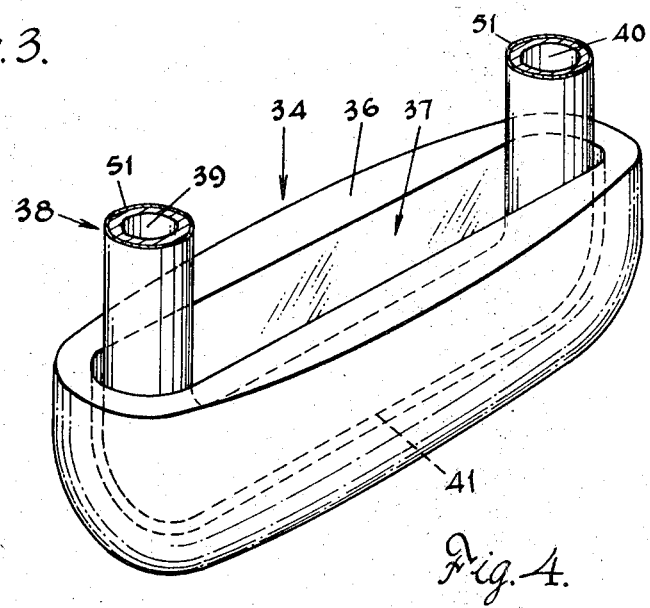
FIG. 4 is a plan view of the preferred form of the device of the invention shown in FIG. 3.

The boat portions of the members 34 must be constructed of a material that will resist the high temperatures encountered and that will not contaminate or adversely affect either the glass in the ribbon or the metal in the bath with which the boats are in contact. Preferably it should also have sufficient lubricating qualities to reduce friction between the boats and the glass ribbon moving therepast. The various types of carbon, for example, are well suited for the purpose and the most desirable boats to date have been machined from carbon blocks to the desired shapes. Thus, a generally oval shaped boat such as shown at 36 in FIGS. 2 and 3, rounded on all sides and bottom surfaces, and with a hollow interior 37 has been used very successfully in actual practice on commercial float glass machines.

These boats 36 are anchored in the desired positions and water cooled by a conduit assembly 38 comprising parallel inlet and return sections 39 and 40 respectively connected at one end by a U-shaped section 41. The assembly 38 is shaped or bent downwardly as at 42 to extend the U-shaped section 41 into the boat 36 where it fits into the hollow interior 37 and can be retained therein by a body or cargo of metal 43 which may be conveniently ladled into the boats 36 from the molten metal in the bath 11. When the metal body 43 is introduced it will be in the molten or liquid state and will usually remain so in the boats that are located at the hot end of the bath but may solidify in any that are at or adjacent the cold end. However the state of the metal body 42 has no bearing on the operation of the device.

The parallel pipes 39 and 40 at the open end of the assembly 38 extend outwardly of the bath enclosure or plenum chamber 23 and are supported for both horizontal and vertical movement in a fixture 44 which includes collars 45 and set screws 46 for maintaining the boats 36 at anchor in any desired position laterally of the bath 11; and an adjusting screw 47 for adjusting the assembly 38 vertically and so controlling the depth to which the boats 36 are immersed.

Flexible connections 48 are provided to permit water or other cooling mediums to be fed to the inlet pipe section 39 and removed from the discharge or outlet section 40. This permits the boats to be cooled and to transmit a cooling action to the molten metal of the bath by establishing heat transfer between the cooling pipes, the body of bath metal within the cavity of the guide member boat, and the guide member boat itself, in the area of the bath in which the boats are floating. This cooling action is sufficient to set up convection currents of the character indicated by the arrows 49 (FIG. 3) which currents urge the glass ribbon toward the adjacent side wall of the bath tank 18 and so maintain the edge 35 in guiding contact with the boats 36 of the guide member 34.

Because of this combined retaining and guiding action resulting from the use of the guide members of the present invention, it is not longer necessary to "fence" both sides of the ribbon within a generally prescribed area of travel, but only to arrange and float the boats 36 at one side of the bath, along the exact line it is desired to have the edge of the ribbon travel, whereupon the ribbon will unwaveringly advance over the bath 11 with its edge precisely on this line.

Figure 5:
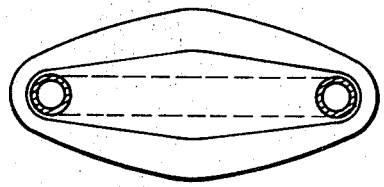
FIG. 5 is a view similar to FIG. 4, but illustrating a somewhat differently contoured guide member.

Obviously the boats 36 can be machined, molded or otherwise contoured to any desired shape, of which the generally oval contour of FIG. 2 is one and the generally diamond contour shown in FIG. 5 is another. Generally speaking it is desirable that the boats present a curved or other surface of small contact potential to the ribbon edge to minimize the area of engagement and facilitate unimpeded relative movement between the glass ribbon and the surface of the boat.

A further advantage of the contoured boats is that they are adaptable not only to straight line use but can also be employed in hotter areas of the bath, where the ribbon edge is curved due to spreading of the glass as it seeks its equilibrium thickness as shown at 50, and in the cooler areas where the ribbon edge is curved due to contraction of the glass in a situation where the ribbon is being attenuated to less than the equilibrium thickness of the glass. Similarly the contoured boats can adapt themselves to other types of non-uniform edge conditions resulting from other causes.

In any event, operation of the boat-like ribbon guiding and retaining members of the invention simply involves positioning and floating the boats in the desired location, anchoring them in this position by operation of the locating and adjusting fixture 44, and controlling the flow of cooling medium to and from the conduit assembly 38 to cool the adjacent area of the bath to the degree required to set up sufficiently strong convection currents beneath the ribbon to maintain the edge 35 thereof in contact with the boat as it is advanced over the float bath.

It has been observed that, when the devices of the invention are operated in this manner, there is no tendency for the glass of the ribbon to stick to the boats; objectionable "fence bubbling" and "tin fizz" are completely eliminated, and these ribbon guiding and retaining devices have a surprisingly long effective and trouble free life in commercial float glass operations. In fact the only limiting factor in their useful life appears to be the tendency of sulfide deposits from the bath atmosphere in the plenum chamber 23 to form on the exposed portion of the pipes in the conduit assembly 38 and eventually drop off into the float bath. However these deposits can be removed from the pipes by occasional removing and cleaning or, according to the invention, the pipes may be coated with an inhibiting or protective coating such as a ceramic paint, indicated at 51 to avoid accumulation of the sulphide deposits.

Further, it is to be understood that the forms of the invention herein shown and described are to be taken as illustrative embodiments only of the same and that various changes in the size, shape and arrangement of parts, as well as various procedural changes may be resorted to without departing from the spirit of the invention as defined in the following claims.

I claim:

1. Float glass forming apparatus including a bath of molten metal over which a ribbon of glass is advanced along a predetermined path within a float atmosphere, a guiding member resistant to glass forming temperatures and inert to said molten metal and said glass, said guiding member floating in said molten metal and against said guiding member an edge of said ribbon is engaged, to guide said ribbon along said path, said guiding member having a central cavity opening upwardly, a body of said bath metal within said cavity, a cooler extending into, through and out of said cavity to anchor said guiding member, said cooler being immersed within said body of bath metal within said cavity to cool said body of metal, and means for controlling the flow of cooling medium to and from said cooler to establish heat transfer between said cooler, said body of bath metal within said cavity, and said guiding member to create convection currents in said bath of molten metal for urging said ribbon toward said guiding member.

2. Apparatus as defined in claim 1 in which said guiding member is a carbon block contoured to present a curved surface to said predetermined path.

3. Apparatus as defined in claim 2 in which said cooler includes parallel pipes extending outwardly beyond said float atmosphere and inwardly over said molten metal bath and connected by a U-shaped section at their inner ends and which section extends downwardly into the central cavity portion of said guiding member.

4. Apparatus as defined in claim 3 in which said contoured guiding member is substantially diamond shaped in plan view.

5. Apparatus as defined in claim 3 in which said contoured guiding member is substantially oval shaped in plan view.

6. Apparatus as defined in claim 5 in which said guiding member is rounded on its side and bottom surfaces.

References Cited

UNITED STATES PATENTS

| 3,223,503 | 12/1965 | Barradell-Smith | 65—99 |
| 3,266,880 | 8/1966 | Pilkington | 65—182 |
| 3,395,996 | 8/1968 | Loukes | 65—99 |
| 3,305,339 | 2/1967 | Plumat. | |
| 3,341,315 | 9/1967 | Patschorke | 65—169 |
| 3,353,943 | 11/1967 | Loutte. | |

S. LEON BASHORE, Primary Examiner

E. R. FREEDMAN, Assistant Examiner

U.S. Cl. X.R.

65—65, 99, 356